United States Patent
Blumer et al.

(10) Patent No.: US 9,938,834 B2
(45) Date of Patent: Apr. 10, 2018

(54) BLADED GAS TURBINE ENGINE ROTORS HAVING DEPOSITED TRANSITION RINGS AND METHODS FOR THE MANUFACTURE THEREOF

(71) Applicant: HONEYWELL INTERNATIONAL INC., Morristown, NJ (US)

(72) Inventors: Eric Blumer, Scottsdale, AZ (US); David K. Jan, Fountain Hills, AZ (US); Jason Smoke, Phoenix, AZ (US); Robbie Joseph Adams, Phoenix, AZ (US); Harry Lester Kington, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 298 days.

(21) Appl. No.: 14/701,262

(22) Filed: Apr. 30, 2015

(65) Prior Publication Data

US 2016/0319666 A1    Nov. 3, 2016

(51) Int. Cl.
*F01D 5/06* (2006.01)
*B22F 3/105* (2006.01)
(Continued)

(52) U.S. Cl.
CPC .......... *F01D 5/066* (2013.01); *B22F 3/1055* (2013.01); *B22F 3/15* (2013.01); *B23P 15/006* (2013.01);
(Continued)

(58) Field of Classification Search
CPC ........ B23F 3/1055; B23F 3/15; B23P 15/006; F01D 5/04; F01D 5/066; F01D 5/30;
(Continued)

(56) References Cited

U.S. PATENT DOCUMENTS

| | | | |
|---|---|---|---|
| 2,384,919 A | 9/1945 | Huber | |
| 2,392,281 A * | 1/1946 | Allen | B23K 33/004 228/165 |

(Continued)

FOREIGN PATENT DOCUMENTS

| | | |
|---|---|---|
| DE | 2130128 A1 | 12/1972 |
| DE | 102009048632 A1 | 4/2001 |

(Continued)

OTHER PUBLICATIONS

Smoke, J. et al. Dual Alloy Gas Turbine Engine Rotors and Methods for the Manufacture Thereof; U.S. Appl. No. 14/823,787 filed with the USPTO on Aug. 11, 2015.

(Continued)

*Primary Examiner* — Jacob Cigna
(74) *Attorney, Agent, or Firm* — Lorenz & Kopf, LLP

(57) ABSTRACT

Bladed Gas Turbine Engine (GTE) rotors including deposited transition rings are provided, as are embodiments of methods for manufacturing bladed GTE rotors. In one embodiment, the method includes providing an outer blade ring having an inner circumferential surface defining a central opening, and depositing a deposited transition ring on the inner circumferential surface of the outer blade ring. The outer blade ring can be a full bladed ring or an annular grouping of individually-fabricated bladed pieces. After deposition of the transition ring, a hub disk is inserted into the central opening such that the transition ring extends around an outer circumferential surface of the hub disk. The transition ring is then bonded to the outer circumferential surface of the hub disk utilizing, for example, a hot isostatic pressing technique to join the transition ring and the outer blade ring thereto.

19 Claims, 6 Drawing Sheets

(51) Int. Cl.

| | | |
|---|---|---|
| *B22F 3/15* | (2006.01) | |
| *B23P 15/00* | (2006.01) | |
| *F01D 5/30* | (2006.01) | |
| *F01D 5/34* | (2006.01) | |
| *F01D 5/04* | (2006.01) | |
| *F04D 29/28* | (2006.01) | |
| *F04D 29/32* | (2006.01) | |
| *F04D 29/60* | (2006.01) | |
| *F04D 29/64* | (2006.01) | |

(52) U.S. Cl.
CPC .............. *F01D 5/04* (2013.01); *F01D 5/3061* (2013.01); *F01D 5/34* (2013.01); *F04D 29/284* (2013.01); *F04D 29/321* (2013.01); *F04D 29/322* (2013.01); *F04D 29/329* (2013.01); *F04D 29/601* (2013.01); *F04D 29/644* (2013.01); *F05D 2220/32* (2013.01); *F05D 2230/10* (2013.01); *F05D 2230/23* (2013.01); *F05D 2230/31* (2013.01); *Y02P 10/295* (2015.11); *Y02T 50/671* (2013.01)

(58) Field of Classification Search
CPC ........ F01D 5/34; F04D 29/284; F04D 29/321; F04D 29/322; F04D 29/329; F04D 29/601; F04D 29/644
See application file for complete search history.

(56) References Cited

U.S. PATENT DOCUMENTS

| | | | |
|---|---|---|---|
| 2,423,165 A | 7/1947 | Allen | |
| 2,450,493 A | 10/1948 | Strub | |
| 2,454,580 A | 11/1948 | Thielemann | |
| 3,246,389 A | 4/1966 | Hans | |
| 3,292,245 A | 12/1966 | Hans | |
| 3,590,454 A | 7/1971 | Brass | |
| 3,692,501 A | 9/1972 | Hoppin et al. | |
| 3,928,029 A | 12/1975 | Fisk | |
| 4,096,615 A | 6/1978 | Cross | |
| 4,152,816 A | 5/1979 | Ewing et al. | |
| 4,270,256 A | 6/1981 | Ewing | |
| 4,494,287 A | 1/1985 | Cruzen et al. | |
| 4,529,452 A | 7/1985 | Walkar | |
| 4,538,331 A * | 9/1985 | Egan | B22D 19/00 164/101 |
| 4,573,876 A * | 3/1986 | Egan | B22D 19/00 219/121.13 |
| 4,581,300 A | 4/1986 | Hoppin, III et al. | |
| 4,592,120 A * | 6/1986 | Egan | B23P 15/006 164/100 |
| 4,659,288 A | 4/1987 | Clark et al. | |
| 4,671,448 A | 6/1987 | Million et al. | |
| 4,710,103 A * | 12/1987 | Faber | B23K 9/046 228/208 |
| 4,782,206 A | 11/1988 | Ayres et al. | |
| 4,812,107 A * | 3/1989 | Barcella | B23K 9/0026 228/160 |
| 4,864,706 A | 9/1989 | Jenkel | |
| 4,907,947 A * | 3/1990 | Hoppin, III | C22C 19/056 148/514 |
| 5,061,154 A | 10/1991 | Kington | |
| 5,106,012 A * | 4/1992 | Hyzak | B21J 5/00 228/125 |
| 5,113,583 A | 5/1992 | Jenkel et al. | |
| 5,273,708 A | 12/1993 | Freeman | |
| 5,390,413 A | 2/1995 | Pratt | |
| 6,098,871 A | 8/2000 | Cairo et al. | |
| 6,118,098 A | 9/2000 | Amos | |
| 6,274,839 B1 | 8/2001 | Stone et al. | |
| 6,326,585 B1 | 12/2001 | Aleshin | |
| 6,814,544 B2 | 11/2004 | Tsukamoto et al. | |
| 6,969,238 B2 | 11/2005 | Groh et al. | |
| 7,316,057 B2 * | 1/2008 | Seth | B21K 1/36 29/458 |
| 7,438,530 B2 | 10/2008 | Ferte et al. | |
| 7,560,065 B2 | 7/2009 | Troitski et al. | |
| 7,634,854 B2 | 12/2009 | Meier | |
| 7,722,330 B2 * | 5/2010 | Seth | B21K 1/36 416/223 A |
| 7,766,623 B2 * | 8/2010 | Chou | B23K 20/129 29/889.23 |
| 7,832,986 B2 | 11/2010 | Baker et al. | |
| 7,967,924 B2 * | 6/2011 | Groh | B22F 3/004 148/410 |
| 8,043,068 B2 | 10/2011 | Imano et al. | |
| 8,220,697 B2 | 7/2012 | Kottilingam et al. | |
| 8,266,800 B2 | 9/2012 | Segletes et al. | |
| 8,356,980 B2 | 1/2013 | Izadi | |
| 8,360,302 B2 | 1/2013 | Richter | |
| 8,408,446 B1 | 4/2013 | Smoke et al. | |
| 8,496,443 B2 | 7/2013 | Campbell et al. | |
| 8,506,836 B2 | 8/2013 | Szuromi et al. | |
| 8,631,577 B2 | 1/2014 | Ing | |
| 8,662,851 B2 | 3/2014 | Izadi | |
| 8,668,442 B2 | 3/2014 | Morris et al. | |
| 8,801,338 B2 | 8/2014 | Ortiz | |
| 8,961,132 B2 | 2/2015 | Suciu et al. | |
| 9,033,670 B2 | 5/2015 | Mittendorf et al. | |
| 9,724,780 B2 | 8/2017 | Miner et al. | |
| 2003/0189028 A1 | 10/2003 | Wright et al. | |
| 2006/0166020 A1 * | 7/2006 | Raybould | C23C 24/04 428/471 |
| 2006/0239825 A1 | 10/2006 | Rice et al. | |
| 2006/0260126 A1 * | 11/2006 | Groh | B22F 3/004 29/889.2 |
| 2008/0107531 A1 * | 5/2008 | Chou | B23K 20/129 416/213 R |
| 2009/0068016 A1 | 3/2009 | Perron et al. | |
| 2009/0119919 A1 | 5/2009 | Kington et al. | |
| 2009/0162205 A1 | 6/2009 | Strangman et al. | |
| 2010/0193480 A1 | 8/2010 | Adams | |
| 2010/0284817 A1 | 11/2010 | Bamberg et al. | |
| 2011/0176922 A1 | 7/2011 | Schmidt | |
| 2014/0093384 A1 | 4/2014 | Mironets et al. | |
| 2014/0124483 A1 | 5/2014 | Henn | |
| 2014/0130353 A1 | 5/2014 | Kington et al. | |
| 2014/0314581 A1 | 10/2014 | McBrien et al. | |
| 2015/0118048 A1 | 4/2015 | Kington et al. | |
| 2015/0144496 A1 | 5/2015 | Morris et al. | |

FOREIGN PATENT DOCUMENTS

| | | |
|---|---|---|
| EP | 2626169 A2 | 2/2013 |
| EP | 2650474 A2 | 10/2013 |
| EP | 2865482 A1 | 4/2015 |
| EP | 3000556 A1 | 9/2015 |
| EP | 2952687 A2 | 12/2015 |

OTHER PUBLICATIONS

Smoke, J. et al. Dual Alloy Bladed Rotors Suitable for Usage in Gas Turbine Engines and Methods for the Manufacture Thereof; U.S. Appl. No. 14/939,360 filed with the USPTO on Nov. 12, 2015.
Extended EP Search Report for Application No. 16182276.2-1709 dated Oct. 31, 2016.
Extended EP Search Report for Application No. 16196480.4-1702 dated Jun. 14, 2017.
Hoppin; Manufacturing Processes for Long-Life Gas Turbines; abstract available online at http://link.springer.com; Jul. 1986, vol. 30, Issue 7, pp. 20-23.
Yang, J. et al.; HIP diffusion bonding of FGH96-DD6 dual alloys; available online at http://www.maneyonline.com; vol. 18, Issue S4, (Jul. 2014), pp. S4-429-S4-434.
Additive Manufacturing; Oct. 7, 2013; http://airinsight.com/2013/10/07/additive-manufacturing/#.
Additive Manufacturing 3D Printing; http://www.sciaky.com/additive_manufacturing.html; 2014 Sciaky, Inc. A Subsidiary of Phillips Service Industries, Inc.—All Rights Reserved.

(56) References Cited

OTHER PUBLICATIONS

Extended EP Search Report for Application No. 16166284.6-1373 dated Aug. 5, 2016.
USPTO Office Action for U.S. Appl. No. 14/823,787 dated Oct. 5, 2017.
EP Examination Report for Application No. 16166284.6-1373 dated Jun. 13, 2017.
USPTO Office Action for U.S. Appl. No. 14/939,360 dated Jan. 17, 2018.

* cited by examiner

BLADED GAS TURBINE ENGINE ROTORS HAVING DEPOSITED TRANSITION RINGS AND METHODS FOR THE MANUFACTURE THEREOF

TECHNICAL FIELD

The present invention relates generally to gas turbine engines and, more particularly, to bladed gas turbine engine rotors having deposited transition rings and methods for the production thereof.

BACKGROUND

Bladed Gas Turbine Engine (GTE) rotors include axial compressor, radial or centrifugal compressor, axial turbine, radial-inflow turbine, and fan rotors. The thermal and mechanical demands placed on a bladed GTE rotor can vary significantly across the rotor during engine operation. Specifically, the rotor blades are typically bathed in the core gas flow during engine operation and are consequently exposed to high temperature, chemically-harsh (e.g., corrosive and oxidative) environments. In contrast, the inner "hub disk" portion of the rotor is largely shielded from the core gas flow path, but is subject to considerable mechanical stress resulting from the centrifugal forces acting on the rotor at high rotational speeds. Performance benefits can thus be realized by producing a GTE rotor having a hub disk and rotor blades fabricated from different alloys tailored to their specific operating environments. For example, an inserted blade approach can be utilized to produce a GTE rotor having a hub disk and rotor blades fabricated from different alloys. To produce such an inserted blade rotor, a number of bladed pieces are first produced from an alloy selected to provide good mechanical strength and oxidation resistance under high temperature conditions. Each bladed piece is fabricated to include at least one blade, which projects from an enlarged base portion or shank. The shanks are inserted into mating slots provided around the periphery of a separately-produced hub disk, which is fabricated from an alloy having high mechanical strength at operational temperatures. The shanks and mating slots are formed to have an interlocking geometry, such as a fir tree or dove tail interface, which prevents disengagement of the shanks in a radial direction during high speed rotation of the rotor.

While enabling the fabrication of a GTE rotor having a disk and blades fabricated from different alloys, the above-described manufacturing approach is limited in several respects. The formation of geometrically complex mating interfaces between the shanks and the hub disk often requires multiple precision machining steps, which add undesired cost, duration, and complexity to the manufacturing process. Additionally, it can be difficult to reliably form a complete seal between the mating shank-disk interfaces. If not fully sealed, these interfaces can trap debris potentially resulting in corrosion-driven failures and permit undesired leakage across the GTE rotor during engine operation. As a still further limitation, the formation of the mating shank-disk interfaces may necessitate an increase in the overall size and weight of the bladed GTE rotor to achieve a structural integrity comparable to that of a single piece or monolithic GTE rotor. Certain other manufacturing methods have been developed wherein the disk hub and blade rings are separately produced from different alloys and subsequently bonded together or metallurgically consolidated to produce a so-called "dual alloy rotor"; however, such approaches are generally restricted to the usage of equiax superalloys having inferior high temperature properties as compared to single crystal and directionally-solidified superalloys.

It is thus desirable to provide methods for manufacturing bladed GTE rotors enabling the joinder of a plurality of blades (e.g., in the form of an outer blade ring) to a hub disk in a manner that reduces the cost and complexity of manufacture, that minimizes leakage across the turbine rotor, and that allows decreases in the overall size and weight of the turbine rotor. It would also be desirable if, in at least some embodiments, the manufacturing method would enable production of the outer blade ring from a plurality of individually-fabricated bladed pieces, which could be cast or otherwise fabricated from a wide variety of high temperature materials including single crystal and directionally-solidified superalloys. Finally, it would be desirable to provide embodiments of a bladed GTE rotor produced utilizing such a manufacturing method. Other desirable features and characteristics of embodiments of the present invention will become apparent from the subsequent Detailed Description and the appended Claims, taken in conjunction with the accompanying drawings and the foregoing Background.

BRIEF SUMMARY

Methods for manufacturing bladed Gas Turbine Engine (GTE) rotors, such as metallurgically consolidated dual alloy rotors, including deposited transition rings are provided. In one embodiment, the method includes providing an outer blade ring having an inner circumferential surface defining a central opening, and depositing the transition ring on the inner circumferential surface of the outer blade ring utilizing, for example, an additive manufacturing process, a cold spray process, or another deposition process during which alloy layers are gradually built-up on the interior of the outer blade ring. The outer blade ring can be a full bladed ring or an annular grouping of individual bladed pieces. After deposition of the transition ring, a hub disk is inserted into the central opening such that the transition ring extends around an outer circumferential surface of the hub disk. The transition ring is then bonded to the outer circumferential surface of the hub disk utilizing, for example, a Hot Isostatic Pressing (HIP) process to join the transition ring and the outer blade ring thereto.

In another embodiment, the manufacturing method includes retaining a plurality of bladed pieces in a ring formation utilizing tooling, while machining an inner circumferential surface of the ring formation. Alloy layers are then deposited around the machined inner circumferential surface of the ring formation to produce a deposited transition ring bonding the plurality of bladed pieces together. A hub disk is positioned in a central opening of the deposited transition ring, and a cylindrical interface between the hub disk and the transition ring is sealed. A HIP process is then carried out to diffusion bond the hub disk to the transition ring.

Embodiments of a bladed GTE rotor having a rotational axis are further provided. The bladed GTE rotor includes a hub disk having an outer circumferential surface, a deposited transition ring extending around and bonded to the outer circumferential surface of the hub disk, and an outer blade ring including a plurality of blades spaced about the rotational axis and projecting from the transition ring. The outer blade ring is bonded to the hub disk through the transition ring. In certain embodiments, the outer blade ring is comprised of a plurality of individually-cast bladed pieces bonded together by the deposited transition ring, the outer blade ring includes a machined inner circumferential surface onto which the transition ring is deposited, and/or the transition ring has a radially-graded composition.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
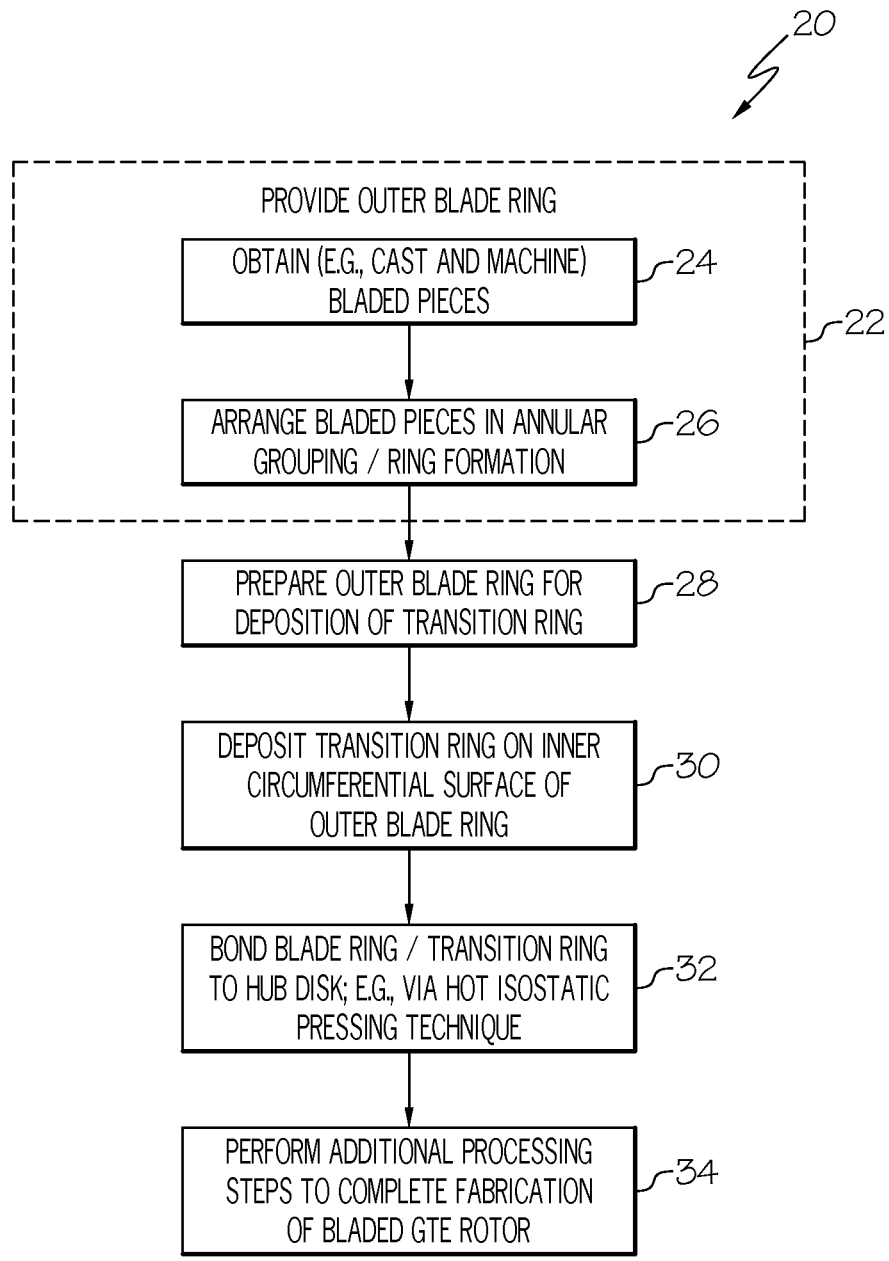
FIG. 1 is a flowchart setting-forth an exemplary method for manufacturing a bladed Gas Turbine Engine (GTE) rotor having a deposited transition ring, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description. As appearing herein, the term "bladed gas turbine engine rotor" does not preclude the possibility that the bladed rotors can be utilized in devices or platforms other than gas turbine engines including, but not limited to, other types of turbomachines, such as turbochargers.

The following describes embodiments of a manufacturing process for producing a bladed GTE rotor produced having a deposited transition ring. As indicated by the term "transition," the transition ring provides a transitional interface or physical bridge between an outer blade ring and an interior body or "hub disk," which is bonded to the transition ring during the manufacturing process. The transition ring can be deposited utilizing a number of different methods including high velocity cold spray, welding build-up, laser cladding, and additive manufacturing deposition processes, such as three dimensional (3D) metal printing processes. The transition ring can be deposited around the inner circumferential surface of the outer blade ring, whether the outer blade ring is a full bladed ring (that is, a single piece or monolithic body) or a plurality of bladed pieces arranged in an annular grouping or ring formation. The transition ring is produced to include a central opening into which a hub disk is matingly inserted and bonded to the transition ring utilizing, for example, a Hot Isostatic Pressing (HIP) process. Additional processes, such as precision machining, can then be performed to complete fabrication of the bladed GTE rotor.

A number of benefits can be realized by producing a bladed GTE rotor to include a deposited transition ring of the type described herein. In embodiments wherein the outer blade ring is produced by arranging a plurality of bladed pieces in a ring formation or annular grouping, deposition of the deposited transition ring on the inner circumferential surface of the outer blade ring can bond the plurality of bladed pieces together in the ring formation and help provide hermetic sealing during the subsequent HIP process (when performed). Furthermore, in embodiments wherein the outer blade ring is produced utilizing a plurality of individual bladed pieces, the bladed pieces can be individually cast or otherwise produced from a wide range of alloys including, but not limited to, equiax, single crystal, and directionally-solidified superalloys. In still further embodiments, a different alloy can be utilized to produce the bladed pieces or blade ring, such as titanium aluminide alloy. Individual fabrication of the bladed pieces also enables blades having internal cooling features or other geometrically complex designs to be produced at relatively high yields reducing the cost and complexity of the manufacturing process.

In certain embodiments, the deposited transition ring may also provide a tailored compositional interface between the outer blade ring and the hub disk, which are preferably (although not necessarily) produced from different superalloy materials. For example, the transition ring can be produced to have a first composition at the boundary with the hub disk, which has a formulation that is highly compatible with the hub disk material and, perhaps, substantially identical to the composition of the hub disk. At the same time, the transition ring can be produced to have a second composition at the boundary with the outer blade ring for increased compatibility with the blade material at operating temperatures. In this manner, the transition ring can serve as a chemical or compositional buffer between the hub disk and the outer blade ring, reducing or eliminating the formation of deleterious metallurgical phases at or near the interface between the blade ring and transition ring or elsewhere in the bladed GTE rotor. Imparting the deposited transition ring with such a radially-graded composition can be beneficial whether the outer blade ring is produced from multiple, discretely-produced bladed pieces or as a full bladed ring. Finally, as compared to certain other known manufacturing processes, build-up of the transition ring can minimize the number of thermal cycles to which the bladed GTE rotor is subjected to help preserve blade strength and the stress rupture capabilities of the completed rotor.

An exemplary embodiment of a method for manufacturing a bladed GTE rotor having a deposited transition ring will now be described in conjunction with FIGS. 1-9. For purposes of explanation, the following describes the exemplary manufacturing method in conjunction with the manufacture of a particular type of bladed GTE rotor, namely, an axial turbine rotor shown at various stages of completion in FIGS. 3-9. The following notwithstanding, it is emphasized that the following description is provided by way of non-limiting example only. The below-described manufacturing method can be utilized to produce any component utilized within a gas turbine engine and having a plurality of blades or airfoils joined to an inner body or hub disk. A nonexhaustive list of such components includes other types of axial turbine rotors, radial-inflow turbine rotors, axial compressor rotors, radial or centrifugal compressor rotors (also referred to as "impellers"), and fan rotors. The bladed GTE rotors described below will often be utilized within a gas turbine engine of the type deployed on an aircraft as a propulsive engine, an Auxiliary Power Unit (APU), or a turboshaft engine. It is noted, however, that the bladed GTE rotors produced pursuant to the below-described manufacturing method can be utilized within any type of gas turbine engine or turbomachine, regardless of application or design.

FIG. 1 is a flowchart illustrating an exemplary method 20 for manufacturing a bladed GTE rotor in accordance with an exemplary embodiment of the present invention. As shown in FIG. 1, method 20 includes a generalized PROCESS BLOCK 22, which may include STEPS 24 and 26 in an embodiment; and subsequently-performed STEPS 28, 30, 32, and 34. Each of these steps is described, in turn, below. Depending upon the particular manner in which method 20 is implemented, each step generically illustrated in FIG. 1 may entail any number of individual sub-processes or combination of sub-processes. Furthermore, the steps illustrated in FIG. 1 and described below are provided by way of example only; in alternative embodiments of method 20, additional steps may be performed, certain steps may be omitted, and/or the illustrated steps may be performed in alternative sequences.

Exemplary method 20 commences with independently fabricating, purchasing, or otherwise providing an outer blade ring (PROCESS BLOCK 22, FIG. 1). As previously noted, the outer blade ring can be monolithic or single piece body commonly referred to as a "full bladed ring." As a more specific example, the outer blade ring can be a single-shot casting produced utilizing an equiax superalloy, which can provide cost savings in instances wherein the resulting capability is sufficient to satisfy rotor requirements. However, in preferred embodiments, the outer blade ring is produced utilizing a number of separately-fabricated bladed pieces, which can be cast or otherwise produced from a wide variety of materials. In this case, and as indicated in FIG. 1, a number of individual bladed pieces are independently fabricated, purchased from a supplier, or otherwise obtained (STEP 24); and subsequently arranged in a non-bonded ring formation or annular grouping to yield the outer blade ring (STEP 26). An example of the manner in which a number of individual bladed pieces can be arranged in a ring formation to form the outer blade ring is described below in conjunction with FIG. 3. First, however, a description of an exemplary bladed piece that may be obtained during STEP 24 of method 20 (FIG. 1) is described in conjunction with FIG. 2.

Figure 2:
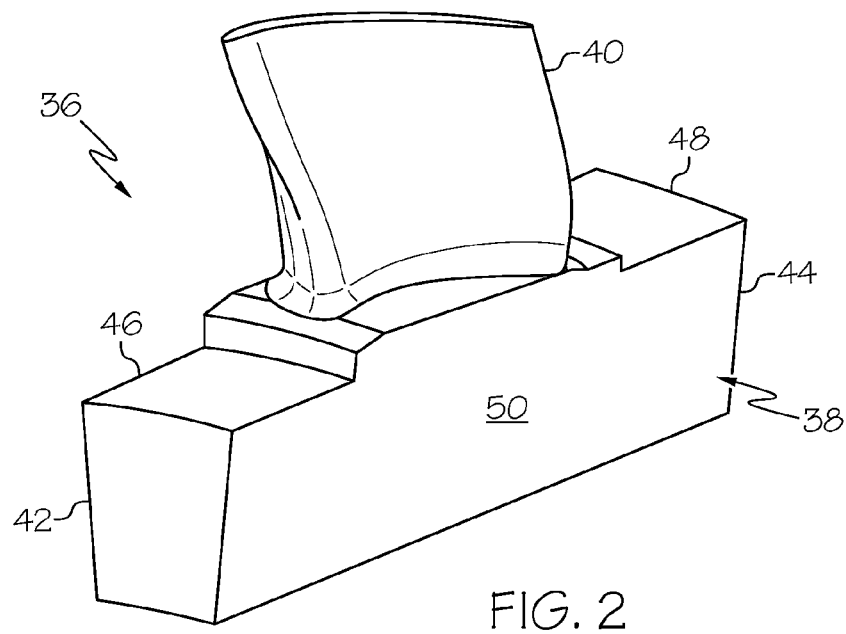
FIG. 2 is an isometric view of a bladed piece that may be produced or otherwise obtained along with a number of like bladed pieces during the exemplary manufacturing method shown in FIG. 1.

FIG. 2 is an isometric view of an exemplary bladed piece 36 that may be obtained during STEP 24 of method 20 (FIG. 1) along with a number of similar bladed pieces (not shown). As shown in FIG. 2, bladed piece 36 includes a wedge-shaped body or shank 38 from which an airfoil or blade 40 extends in a radially-outward direction. In this example, shank 38 has been cast or otherwise fabricated to include an outer sacrificial portion that envelops or encompasses the desired shape of the completed shank. Stated differently, shank 38 is a rough casting or preform physically embodying the finished shank, which may later be defined by further machining as described below in conjunction with FIG. 8. Shank 38 includes shoulders 42 and 44, which extend from the central body of shank 38 in opposing axial directions. Shoulders 42 and 44 are fabricated to include outer tooling contact surfaces 46 and 48, respectively, which are located axially adjacent the forward and aft ends of blade 40 and which have a gently curved or arced outer geometry. Shank 38 also includes opposing lateral faces or sidewall surfaces 50, only one of which can be seen in FIG. 2. Sidewall surfaces 50 are each angled to impart shank 38 with a wedge-shaped geometry, when viewed from the forward/leading or aft/trailing end thereof.

Bladed piece 36 and the other bladed pieces obtained during STEP 24 of exemplary method 20 (FIG. 1) are preferably fabricated from an oxidation-resistant material having good mechanical strength (e.g., tensile, creep, and fatigue properties) at high temperatures. In one embodiment, each bladed piece 36 is cast or otherwise produced from a single crystal or directionally-solidified superalloy having its crystallographic grain structure oriented to provide optimal mechanical strength in a radial direction. By way of non-limiting example, a creep-resistant, single crystal, nickel-based superalloy may be utilized, such as the nickel-based superalloys commercially identified as "CMSX 3," "CMSX 4," "SC180," and "1484," to list but a few examples. This notwithstanding, the bladed pieces may be fabricated from other high temperature materials, as well, including equiaxed superalloys. Regardless of the particular material from which bladed piece 36 are produced, the initial fabrication of a plurality of individual or discrete bladed pieces, provides several advantages as compared to the production of full blade ring. By initially casting or otherwise producing individual bladed pieces, any defective or unusable pieces can be identified prior to integration into the outer blade ring; consequently, scrap volume and cost can be greatly reduced as compared to a single shot casting process wherein any voiding, occlusions, or other defects may require rejection of the entire ring casting. In addition, casting can typically be more reliably and precisely controlled for smaller volume pieces; thus, casting individual bladed pieces generally allows for higher yields due to more reliable filling of the individual bladed pieces and the production of bladed pieces having relatively complex external and internal features, such as internal cooling passages and heat transfer enhancement features.

Figure 3:
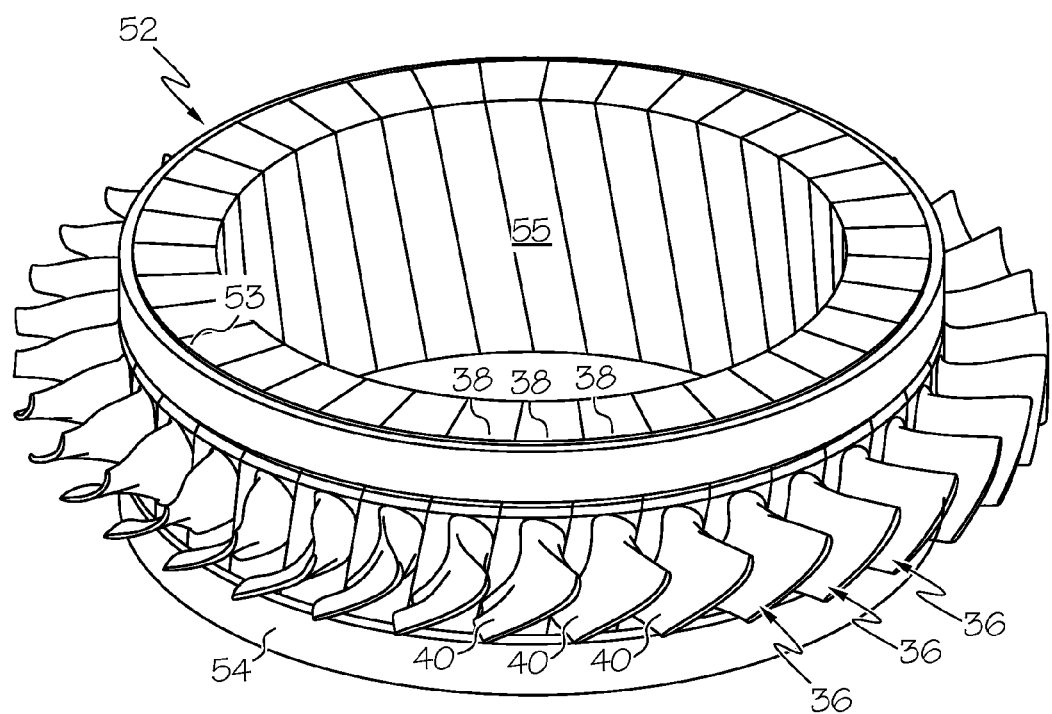
FIG. 3 is an isometric view of an outer blade ring formed by arranging the bladed piece shown in FIG. 2 and a number of like bladed pieces in a ring formation.
Figure 4:
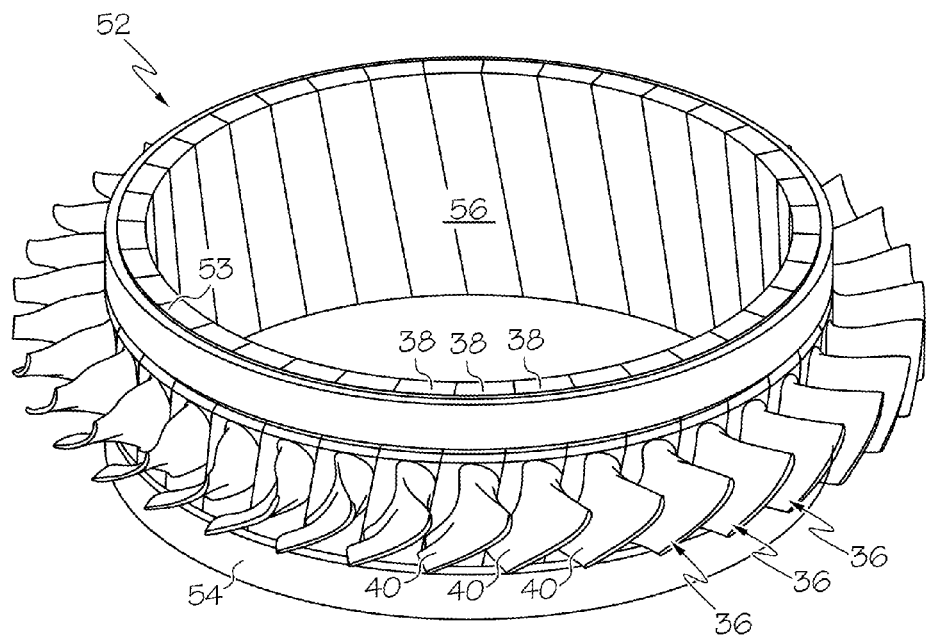
FIG. 4 is an isometric view of the outer blade ring shown in FIG. 3 after machining the inner circumferential surface of the blade ring to a desired diameter and geometry.

Continuing with exemplary method 20, the bladed pieces are next arranged into an annular grouping or ring formation to produce an outer blade ring (STEP 26, FIG. 1). FIG. 3 illustrates an outer blade ring 52 that may be produced during STEP 26 (FIG. 1) by arranging bladed piece 36 and a number of similar bladed pieces in a ring formation (like reference numerals utilized to denote like structural elements). When arranged in such a ring formation, the shank 38 of each bladed piece 36 is positioned between the shanks 38 of two neighboring bladed pieces 36 (three of which are labeled in FIG. 3). In this manner, the outer tooling contact surfaces 46 and 48 of axially-extending shoulders 42 and 44 of each bladed piece 36 combine to form two tooling contact surfaces 53 (see also FIG. 5). Tooling contact surfaces 53 extend from circumferentially-spaced blades 40 of outer blade ring 52 in opposing axial directions and each have a substantially annular geometry. As further indicated in FIG. 3, outer blade ring 52 also includes an inner circumferential surface 55, which defines a central opening into which a hub disk is inserted after deposition of the transiting ring described below.

Although the possibility that bladed pieces 36 could be inter-bonded in some manner is not precluded, bladed pieces 36 will typically remain unbonded at this juncture in this manufacturing process. A tooling fixture is thus utilized to retain bladed pieces 36 in their desired positions for subsequent processing of outer blade ring 52. The tooling fixture can assume any form suitable for maintaining bladed pieces 36 in a ring formation or annular grouping through at least the deposition or build-up of the transition ring. For example, as indicated in FIG. 3, a tooling fixture including two retainer rings 54 can be utilized. When bladed pieces 36 are loaded into the tool, retainer rings 54 are disposed around and circumscribe annular tooling contact surfaces 53. Retainer rings 54 exert a radially constrictive force on outer blade ring 52 to maintain the wedge-shaped shanks 38 of bladed pieces 36 in an arch-bound state and thereby retain bladed pieces 36 in a ring formation or annular grouping. In one embodiment, retainer rings 54 are shrink rings; that is, metal rings having a coefficient of thermal expansion (CTE) greater than that of outer blade ring 52. In this case, retainer rings 54 may be expanded by heating, slipped around annular tooling contact surfaces 53 of outer blade ring 52, and then allowed to cool and contract to exert a radially constrictive force on the bladed pieces 36 making-up blade ring 52. In further embodiments, various other types of tooling can be utilized to maintain the desired alignment between the bladed pieces making-up the blade ring regardless of whether the tooling exerts a radially constrictive force on the bladed pieces.

After loading bladed pieces 36 into the tool such that retainer rings 54 extend around tooling contact surfaces 53, outer blade ring 52 may be prepared for build-up of the below-described transition ring (STEP 28, FIG. 1). For example, an inner circumferential portion of outer blade ring 52 can be machined by, for example, turning to impart blade ring 52 with an inner circumferential surface having a desired geometry and inner diameter. This may be more fully appreciated by referring to FIG. 4, which illustrates outer blade ring 52 after turning to impart inner circumferential surface 56 with a desired geometry and to impart the central opening of ring 52 with a tightly controlled inner diameter. In the embodiment shown in FIG. 4, inner circumferential surface 56 is imparted with a substantially annular geometry after machining. However, it is possible to impart inner circumferential surface 56 with more complex inner geometries, such as sinusoidal or waved geometries, in further embodiments to increase surface area available for bonding with the subsequently-deposited material, and/or tailor the stress state of the bond prior to deposition of the transition ring material. Additionally or alternatively, bonding may also be promoted by enhancing inner circumferential surface 56 utilizing, for example, a selectively-applied coating.

Next, at STEP 30 of exemplary method 20 (FIG. 1), a transition ring is deposited on inner circumferential surface 56 of outer blade ring 52. As indicated above, any deposition process suitable for producing a transition ring over the interior of outer blade ring 52 can be utilized. Such processes include, but are not limited to, spray deposition (e.g., high velocity cold spray), laser cladding, welding build-up, and additive manufacturing processes. For example, in certain implementations, the transition ring can be produced utilizing a deposition process during which layers of at least one alloy supplied by one or more feed sources (e.g., superalloy wire or powder feeds) is heated to a temperature sufficient to fuse the metallic constituents of the alloy and thereby gradually build-up one or more layers of material forming the transition ring. Deposition processes of this type include fully automated additive manufacturing processes, such as 3D metal printing deposition processes, which produce the transition ring in accordance with a pre-established Computer-Aided Design (CAD) model or other 3D object data. In other embodiments, the transition ring can be produced utilizing a semi-automated deposition process, which does not rely upon a pre-existing digital file in producing the transition ring. For example, when a semi-automated deposition process is utilized, a computer can be programmed to move the deposition tool and/or outer blade ring 52 in a particular manner to deposit the transition ring in a desired location and to desired dimensions. In still further embodiments, the transition ring can be produced utilizing a manual deposition technique, such as a gas tungsten arc welding, gas metal arc welding, or a shielded metal arc welding technique.

Figure 5:
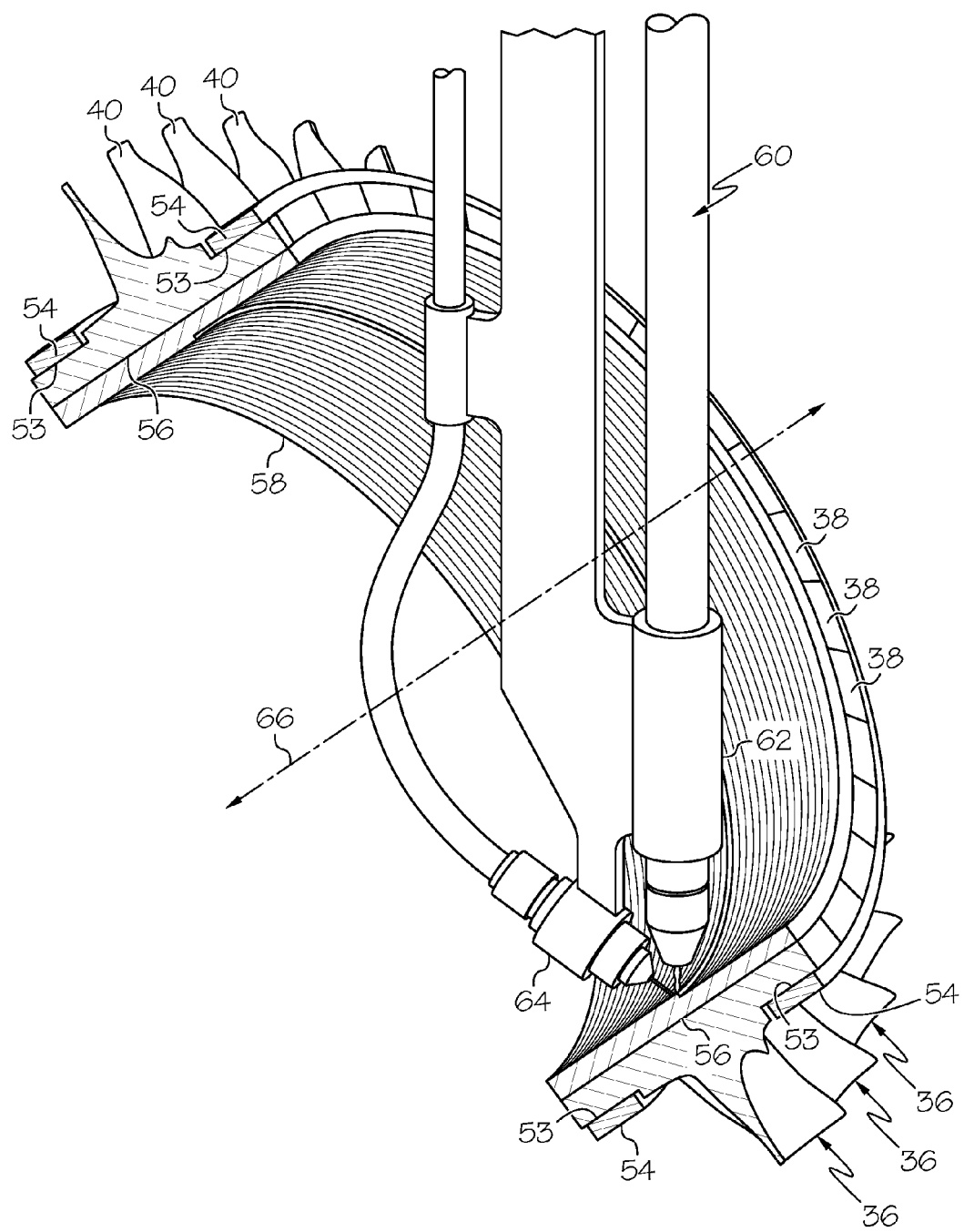
FIG. 5 is a cross-sectional view of the outer blade ring shown in FIG. 3 illustrating one manner in which an additive manufacturing process can be utilized to build-up a transition ring on the inner circumferential surface of the blade ring during the exemplary manufacturing method shown in FIG. 1.

FIG. 5 is a cross-sectional view of outer blade ring 52 illustrated during deposition of a transition ring 58 (shown in a partially-completed state). In this particular example, transition ring 58 is deposited utilizing an additive manufacturing technique and, specifically, a 3D metal printing process. For this reason, transition ring 58 may be more fully referred to hereafter as "additively-built transition ring 58." It is emphasized, however, that this terminology is utilized by way of non-limiting example only and that transition ring 58 can be produced utilizing other types of deposition processes in other embodiments. As can be seen in FIG. 5, additively-built transition ring 58 is deposited on inner circumferential surface 56 of outer blade ring 52 utilizing an additive manufacturing tool 60 having a wire feed head 64 and a plasma arc head 62. In the illustrated example, additive manufacturing tool 60 is utilized to build-up transition ring 58 as a number of bands, which are concentric with the rotational axis or centerline 66 of outer blade ring 52 and, more generally, the bladed GTE rotor. In this case, the width of the deposited bands (as taken along axis 66) are less than the width of outer blade ring 52 such that multiple bands are deposited in a side-by-side relationship or in a spiral pattern to cover inner circumferential surface 56 and form a complete layer.

Additional overlying layers of material may be successively deposited to impart additively-built transition ring 58 with a desired radial thickness. Outer blade ring 52, additive manufacturing tool 60, or both blade ring and tool 60 may be continuously or intermittently moved during build-up of transition ring 58. For example, in one implementation, outer blade ring 52 is rotated about centerline/rotational axis 66 while additive manufacturing tool 60 remains stationary during the additive manufacturing process. Build-up of transition ring 58 is advantageously performed in a hermetic chamber having a controlled temperature and atmosphere to promote a strong, defect-free bond between transition ring 58 and outer blade ring 52. In further embodiments, a different type of feed source (e.g., a powder feed source) and/or a different type of heat source (e.g., a laser heat source) can be utilized during the additive manufacturing process. Additionally, while a single alloy feed is shown in FIG. 5 (i.e., the alloy wire feed supplied through head 64), multiple feeds can be utilized in further embodiments. This approach may be particularly useful when it is desired to impart additively-built transition ring 58 with a graded composition, as described more fully below in conjunction with FIG. 8. A transition ring having a graded composition can also be produced over the interior of outer blade ring 52 utilizing another deposition process, such a high velocity cold spray process.

Figure 6:
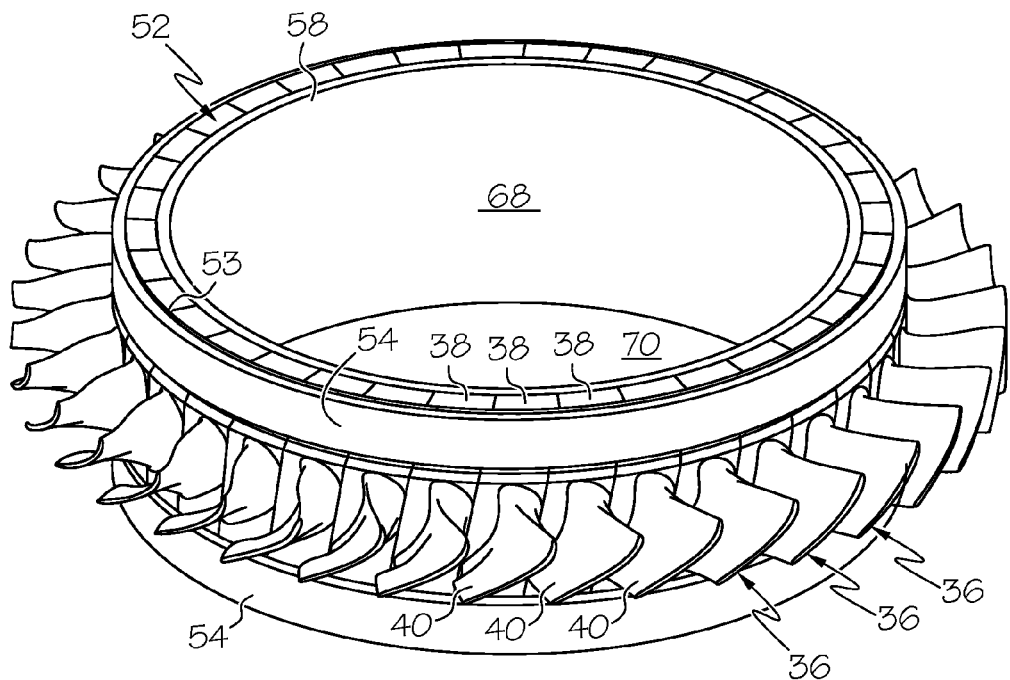
FIG. 6 is an isometric view of the outer blade ring and the deposited transition ring after machining of the inner circumferential surface of the transition ring.

After deposition, additively-built transition ring 58 may be machined, if needed, to improve surface finish and/or to impart transition ring 58 with a desired inner diameter and final thickness. By way of non-limiting example, the final thickness of transition ring 58 may be between about 0.015 inch (0.381 millimeter) and about 0.5 inch (12.7 millimeter) in an embodiment; the term "about," as appearing herein, denoting a disparity of less than 10%. In other embodiments, transition ring 58 may be thicker or thinner than the aforementioned range. Generally, when outer blade ring 52 is made-up of a plurality of non-bonded bladed pieces, such as bladed pieces 36 shown in FIGS. 3-5, transition ring 58 will typically be deposited to a greater thickness to provide a relatively strong mechanical bond between the bladed pieces. Conversely, in embodiments wherein the outer blade ring is a full bladed ring or is assembled from bladed pieces that have been bonded together in some manner, transition ring 58 may be deposited to a lesser thickness as transition ring 58 need only serve as a compositional buffer function between outer blade ring 52 and the subsequently-bonded hub disk, as described more fully below in conjunction with FIG. 8. FIG. 6 illustrates transition ring 58 after machining to impart inner circumferential surface 68 with a desired surface finish and to impart central opening 70 of transition ring 58 and outer blade ring 52 with a desired inner diameter.

Figure 7:
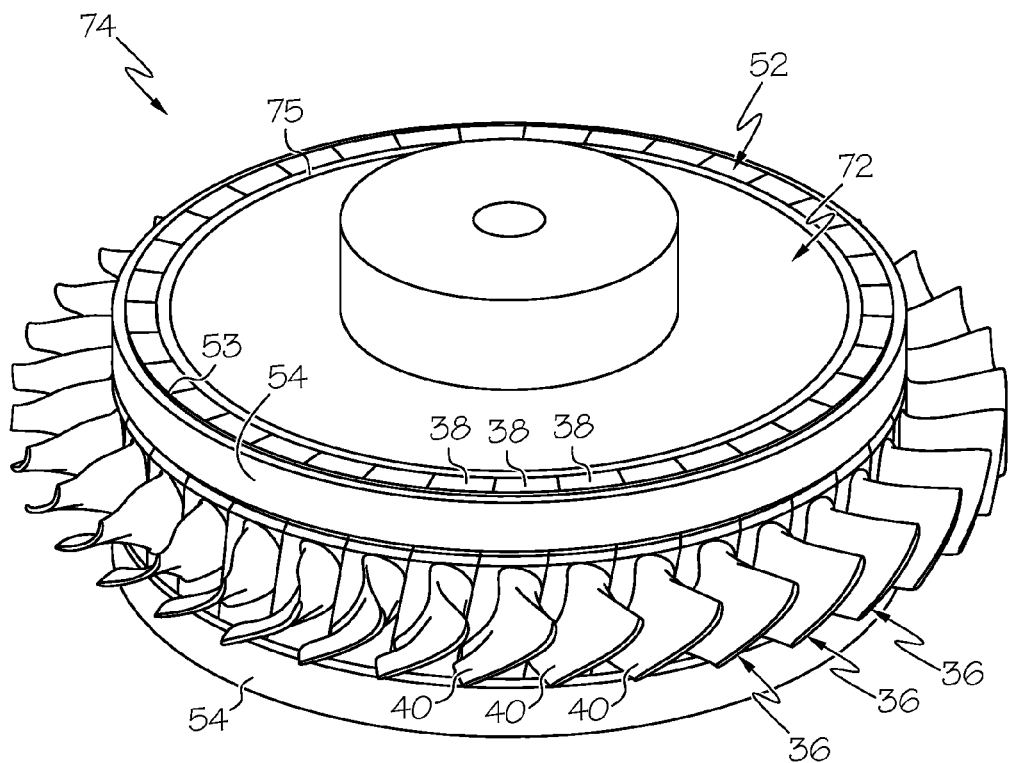
FIG. 7 is an isometric view of the outer blade ring and the transition ring after insertion of a hub disk into the central opening of the transition ring.

Advancing to STEP 32 of exemplary method 10 (FIG. 1), a hub disk is next inserted into and bonded to additively-built transition ring 58. The resulting structure is shown in FIG. 7 wherein the hub disk is identified by reference numeral "72," while the entire structure is identified by reference numeral "74" and referred to hereafter as "bladed GTE rotor 74." As can be seen in FIG. 7, hub disk 72 has been positioned within the central opening of additively-built transition ring 58 such that transition ring 58 extends therearound. Hub disk 72 is produced separately by, for example, forging and subsequent machining. Hub disk 72 can thus be fabricated from a superalloy tailored to the unique operational environment of the disk; e.g., an alloy having relatively high strength and good low cycle fatigue properties. In one implementation, the hub disk is fabricated from an oxidation-resistant, nickel-based superalloy. An annular or cylindrical interface 75 is thus formed between the inner diameter of transition ring 58 and the outer diameter of hub disk 72. When a HIP process is utilized to bond hub disk 72 to transition ring 58, the cylindrical interface 75 is preferably hermetically sealed prior to the HIP process by, for example, forming annular seals along the interface 75 at the opposing faces (fore and aft faces) of bladed GTE rotor 74. The hermetic seals can be formed by brazing under vacuum or by placing bladed GTE rotor 74 in a specially-designed HIP can. Afterwards, the HIP bonding process can be carried out to diffusion bond transition ring 58 to hub disk 72. HIP bonding can be performed by placing bladed GTE rotor 74 within a furnace and then subjecting GTE rotor 74 to elevated temperatures and pressures sufficient to create the desired diffusion bond between hub disk 72 and transition ring 58.

Figure 8:
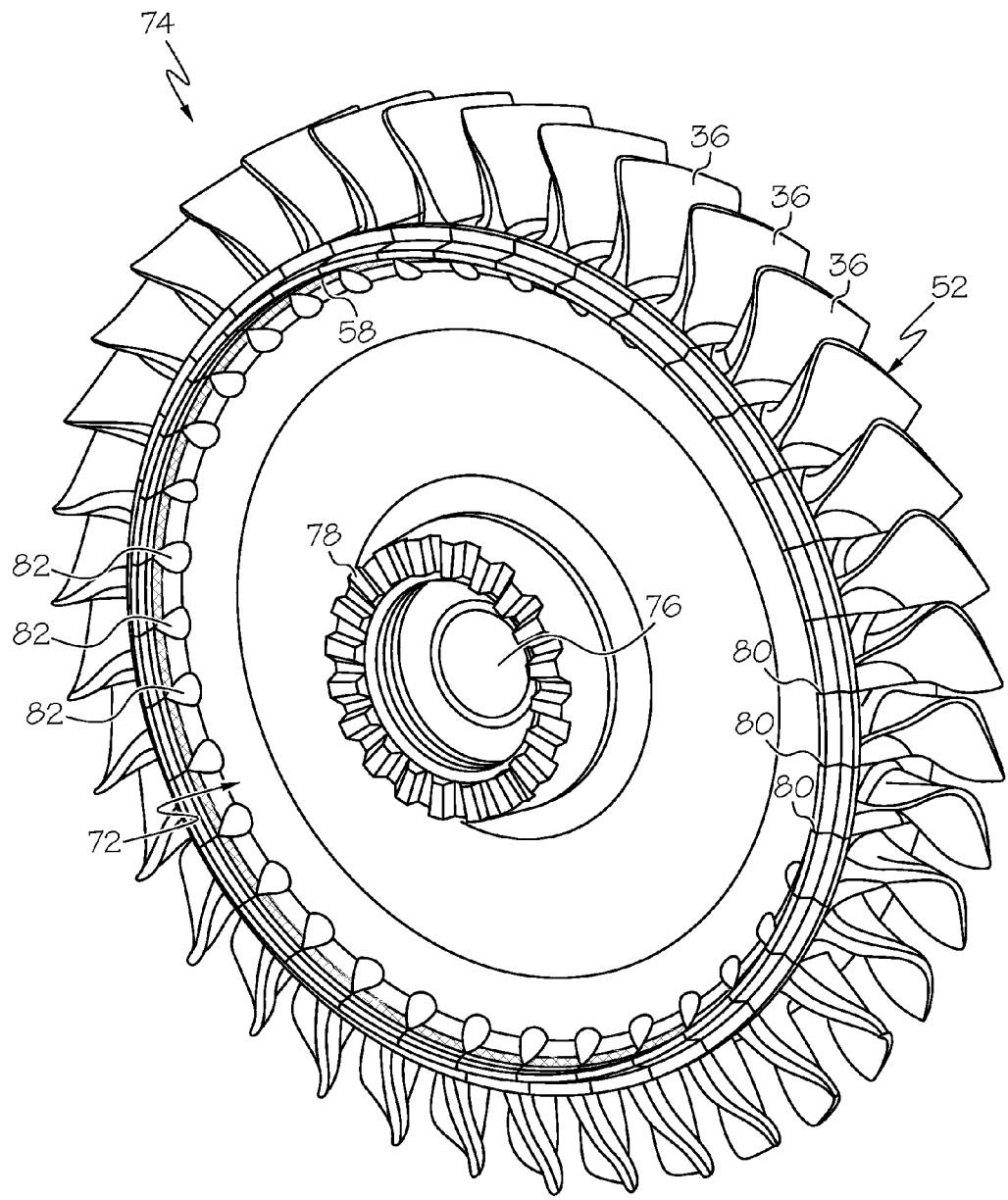
FIG. 8 is an isometric view of a bladed GTE rotor produced after diffusion bonding the hub disk shown in FIG. 7 to the transition ring and further machining defining certain features of the completed rotor.

After bonding hub disk 72 to deposited transition ring 58, additional processing steps may be performed to complete fabrication of bladed GTE rotor 74 (STEP 34, FIG. 1). Such steps may include additional machining to create the more detailed or refined features of rotor 74. Consider, for example, FIG. 8 illustrating bladed GTE rotor 74 in a completed state. Additional machining has been performed to impart bladed GTE rotor 74 with an axial bore or central channel 76 extending through hub disk 72. Additionally, a castellated or toothed tubular protrusion 78 has been formed on hub disk 72 for the purpose of mating with a corresponding castellated or toothed member when bladed GTE 72 is installed within a gas turbine engine. Finally, stress relief features have further been machined into bladed GTE rotor 74. As indicated in FIG. 8, such stress relief features can include enlarged stress relief openings 82, which extend axially through transition ring 58 and an outer radial portion of hub disk 72. In the illustrated embodiment wherein outer blade ring 52 is produced from a number of bladed pieces 36, bladed pieces 36 remain separated by non-bonded regions or radial split lines 80 in the finished rotor. In alternative embodiments wherein outer blade ring 52 is produced from a full blade ring, radial split lines 80 may be cut into blade ring 52 after the above-described HIP bonding process utilizing, for example, a wire electrical discharge machining (EDM) process. Radial split lines 80 thus help to reduce stresses within GTE rotor 74 during typical gas turbine engine operation resulting from thermal gradients and high speed rotation, while stress relief openings 82 distribute mechanical and thermal stress more uniformly to reduce stress risers within rotor 74.

As previously noted, additively-built transition ring 58 can be produced to have a radially-graded composition in certain embodiments; that is, a composition that varies in a controlled manner when moving radially through transition ring 58 from hub disk 72 toward outer blade ring 52, whether the composition varies in gradual manner or in a more discrete, step-like manner. Specifically, by way of non-limiting example only, transition ring 58 can be produced to have: (i) a first composition at the annular boundary between transition ring 58 and hub disk 72 (referred to herein as the "inner boundary composition"), and (ii) a second composition at the annular boundary between transition ring 58 and outer blade ring 52 (referred to herein as the "outer boundary composition"). The inner and outer boundary compositions can be uniquely formulated for high temperature metallurgical compatibility with hub disk 72 and outer blade ring 52, respectively. The inner boundary composition of transition ring 58 may be produced to have a formulation similar or identical to that of hub disk 72. The outer boundary composition of transition ring 58 is advantageously tailored to avoid deleterious metallurgical phases (e.g., sigma and topologically close-packed phases) in regions of bladed GTE rotor 74 within or adjacent transition ring 58, such as the diffusion bond-affected regions of ring 58. In certain embodiments, the outer boundary composition may also include minor additions of grain boundary strengtheners at or near the blade interface to provide such strengtheners in local regions of recrystallization, as may be appropriate for single crystal blade alloys.

Additively-built transition ring 58 can be produced to have a graded composition by initially depositing an alloy material having the desired outer boundary composition during the deposition process. At an appropriate time (e.g., as the deposition process nears completion), the deposition process may then be controlled such that the deposited alloy material transitions to the inner boundary composition. In certain embodiments, transition ring 58 can be produced such that its composition varies in a gradually or substantially continuous fashion when moving from a location radially adjacent outer blade ring 52 to a location radially adjacent hub disk 72 by, for example, varying the relative feed rate of two or more different alloy feed sources during deposition of transition ring 58, whether transition ring 58 is produced utilizing an additive manufacturing process of the type described above, a cold spray deposition process, or another deposition process permitting the usage of multiple alloy feeds. In further embodiments, transition ring 58 can be produced such that its composition varies in discrete or stepped manner when moving radially through the thickness of transition ring 58. In this latter case, the first layer deposited during build-up of transition ring 58 can have the desired outer boundary composition, the last layer deposited during build-up of transition ring 58 can have the desired inner boundary composition, and any number of intervening layers can be deposited between the first and last layers having compositions providing transitional steps between the outer boundary and inner boundary compositions. In still further embodiments, transition ring 58 can be produced to have a substantially uniform or non-graded composition.

There has thus been provided embodiments of a manufacturing process for producing a bladed GTE rotor having a deposited transition ring, such as an additively-built transition ring; that is, a transition ring produced utilizing a 3D metal printing process or another additive manufacturing process. As compared to other manufacturing processes enabling an outer blade ring to be joined to a hub disk, the above-described manufacturing process can reduce the cost and complexity of rotor manufacture, minimizes leakage across the turbine rotor, and allows a decrease in the overall size and weight of the turbine rotor. Furthermore, as compared to certain other known manufacturing processes, the above-described fabrication process can minimize the number of thermal cycles to which the bladed GTE rotor is subjected to help preserve blade (e.g., creep rupture and fatigue) strength and preserve (e.g., tensile and fatigue) strength the rotor. Additionally, in embodiments wherein the deposited transition ring is produced from a number of individually-fabricated bladed pieces, the bladed pieces can be cast or otherwise fabricated from a wide range of high temperature materials including single crystal and directionally-solidified superalloys to facilitate the production of dual alloy GTE rotors. In certain embodiments, the deposited transition ring can be produced to have a radially graded composition improving rotor performance by, for example, optimizing the diffusion bond properties at the outer annular interface between the deposited transition ring and the blade ring and/or at the inner annular interface between the transition ring and the HIP-bonded hub disk. Finally, the foregoing has also provided embodiments of a gas turbine engine rotor including such a deposited transition ring.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for manufacturing a bladed Gas Turbine Engine (GTE) rotor, the method comprising:
   providing an outer blade ring having an inner circumferential surface defining a central opening;
   machining the inner circumferential surface of the outer blade ring;
   depositing a transition ring on the machined inner circumferential surface of the outer blade ring;
   after deposition of the transition ring, inserting a hub disk into the central opening such that the transition ring extends around an outer circumferential surface of the hub disk; and
   bonding the transition ring to the outer circumferential surface of the hub disk to join the transition ring and the outer blade ring thereto.

2. The method of claim 1 wherein depositing the transition ring comprises depositing layers of an alloy material on the inner circumferential surface of the outer blade ring utilizing an additive manufacturing process.

3. The method of claim 1 wherein the depositing the transition ring comprises depositing an alloy material on the inner circumferential surface of the outer blade ring utilizing a high velocity cold spray process.

4. The method of claim 1 wherein depositing the transition ring comprises depositing a plurality of alloy bands extending around the inner circumferential surface of the outer blade ring and substantially coaxial with a rotational axis of the bladed GTE rotor.

5. The method of claim 1 wherein the outer blade ring has a centerline, and wherein the outer blade ring is rotated about the centerline as the transition ring is deposited on the inner circumferential surface.

6. The method of claim 1 further comprising machining an inner circumferential surface of the transition ring after deposition thereof.

7. The method of claim 1 wherein bonding the transition ring to the outer circumferential surface of the hub disk comprises:
   hermetically sealing a cylindrical interface between the transition ring and the hub disk; and
   after hermetically sealing the cylindrical interface, diffusion bonding the transition ring to the hub disk utilizing a Hot Isostatic Pressing (HIP) process.

8. The method of claim 1 further comprising, after bonding the transition ring to the outer circumferential surface of the hub disk, producing a plurality of strain relief features in the bladed GTE rotor extending through the transition ring.

9. The method of claim 1 wherein depositing the transition ring comprises producing the transition ring to have an outer boundary composition at a location radially adjacent the outer blade ring and to have an inner boundary composition at a location radially adjacent the hub disk, the outer boundary composition different than the inner boundary composition.

10. The method of claim 9 further comprising forming the transition ring such that the inner boundary composition contains added grain boundary strengtheners in local regions of recrystallization adjacent the plurality of bladed pieces.

11. The method of claim 1 wherein providing the outer blade ring comprises:
   obtaining a plurality of bladed pieces; and
   arranging the plurality of bladed pieces in an annular grouping forming the outer blade ring.

12. The method of claim 11 wherein the transition ring is produced from a material and deposited to a thickness sufficient to bond together the plurality of bladed pieces in the outer blade ring.

13. The method of claim 12 wherein the plurality of bladed pieces remain unbonded until production of the transition ring, and wherein the method further comprises installing tooling around the outer blade ring to maintain the plurality of bladed pieces in their desired position during deposition of the transition ring.

14. A method for manufacturing a bladed Gas Turbine Engine (GTE) component, comprising:
   arranging a plurality of bladed pieces in a ring formation;
   machining an inner circumferential surface of the ring formation, while retaining the plurality of bladed pieces in the ring formation utilizing tooling;

depositing alloy layers around the machined inner circumferential surface of the ring formation to produce a deposited transition ring bonding the plurality of bladed pieces together;

positioning a hub disk in a central opening of the deposited transition ring;

sealing a cylindrical interface between the hub disk and the deposited transition ring; and performing a Hot Isostatic Pressing (HIP) process to diffusion bond the hub disk to the deposited transition ring.

15. The method of claim 14 wherein depositing further comprises varying the composition of one or more alloys deposited during deposition of the alloy layers to impart the deposited transition ring with a radially-graded composition.

16. The method of claim 14 wherein the alloy layers are deposited around the inner circumference of the ring formation utilizing one of the group consisting of an additive manufacturing process and a cold spray deposition process.

17. A method for manufacturing a bladed Gas Turbine Engine (GTE) rotor, the method comprising:

providing an outer blade ring having an inner circumferential surface;

forming an additively-built transition ring on the inner circumferential surface of the outer blade ring utilizing a three dimensional metal printing process during which multiple alloy bands are deposited by fusing material supplied by at least one superalloy powder source or at least one superalloy wire feed source to gradually build-up the additively-built transition ring in accordance with pre-established three dimensional object data;

positioning a hub disk in a central opening of the additively-built transition ring;

sealing a cylindrical interface between the hub disk and the additively-built transition ring; and performing a Hot Isostatic Pressing (HIP) process to diffusion bond the hub disk to the additively-built transition ring.

18. The method of claim 17 wherein providing comprises forming the outer blade ring by arranging a plurality of bladed pieces in an annular grouping, the plurality of bladed pieces each comprising a shank having opposing axial shoulders;

wherein the opposing axial shoulders cooperate to define first and second annular tooling contact surfaces when the plurality of bladed pieces is arranged in the annular grouping; and wherein the method further comprises positioning a tooling fixture around the plurality of bladed pieces and in contact with the first and second annular tooling contact surfaces to maintain the plurality of bladed pieces in the annular grouping during deposition of the additively-built transition ring.

19. The method of claim 18 wherein the tooling fixture comprises first and second shrink rings; and wherein the method further comprises positioning the first and second shrink rings around the first and second annular tooling contact surfaces, respectively, to maintain the plurality of bladed pieces in the ring formation during deposition of the additively-built transition ring.

* * * * *